United States Patent [19]

Rogov et al.

[11] Patent Number: 4,971,675
[45] Date of Patent: Nov. 20, 1990

[54] ELECTROLYZER FOR PURIFICATION OF FLUIDS

[76] Inventors: Vladimir M. Rogov, ulitsa Moskovskaya, 67a, kv. 15; Igor V. Moskalev, ulitsa Strutinskoi, 8, kv. 89; Viktor L. Filipchuk, ulitsa Moskovskaya, 67a, kv. 17; Dmitry N. Plastunov, ulitsa Gorkogo, 69, kv. 16, all of Rovno, U.S.S.R.

[21] Appl. No.: 455,370
[22] PCT Filed: May 26, 1988
[86] PCT No.: PCT/SU88/00126
 § 371 Date: Jan. 23, 1990
 § 102(e) Date: Jan. 23, 1990
[87] PCT Pub. No.: WO89/11452
 PCT Pub. Date: Nov. 30, 1989
[51] Int. Cl.$^5$ ............................................. C02F 1/46
[52] U.S. Cl. ................................................... 204/212
[58] Field of Search .......................................... 204/212

[56] References Cited

FOREIGN PATENT DOCUMENTS

| 2533910 | 4/1984 | France . |
| 645943 | 2/1979 | U.S.S.R. . |
| 700468 | 12/1979 | U.S.S.R. . |
| 1104113 | 7/1984 | U.S.S.R. . |
| 1122618 | 11/1984 | U.S.S.R. . |

Primary Examiner—T. M. Tufariello
Attorney, Agent, or Firm—Burgess, Ryan & Wayne

[57] ABSTRACT

An electrolyzer consists of a casing (1) with an electrically conducting charge (5) which is in fact an anode and an cathode-plate (6) insulated from the charge (5) by a diaphragm (11). The plate (6) divides the casing (1) into two chambers (7,8) along the length of the axis (9) of its rotation. The pipes (13) for discharge fluids are bent. The cathode may be made in the form of a charge consisting of particles of electrically conducting material.

3 Claims, 2 Drawing Sheets

ELECTROLYZER FOR PURIFICATION OF FLUIDS

TECHNICAL FIELD

The invention relates to electrochemical apparatuses for the purification of fluids, and more particularly, it deals with bulk electrodes for the purification of fluids from various contaminants.

BACKGROUND OF THE INVENTION

Known in the art is a number of electrolyzers for the purification of fluids having bulk chip electrodes. For example, known in the art is the electrolyzer described in SU, A, No. 700468.

This known in the art electrolyzer comprises a vertically extending cylindrical electrically conducting casing containing a charge of chip with an anode current lead provided in the bottom part of the casing, a perforated plate cathode positioned above the charge and insulated therefrom by means of a perforated insulating diaphragm, a pipe for supplying waste fluid into the charge, and a pipe for removing the fluid after the treatment positioned in the top part of the casing.

The charge is dissolved in this electrolyzer during the flow of fluid through the stationary charge. Consequently, electrolysis products formed during operation of the electrolyzer contaminate the charge thus resulting in an increase in the ohmic resistance of the bulk electrode and in the formation of dead zones within the volume of the electrode.

In view of the above, it is necessary, during operation of the electrolyzer, to carry out regular air-water regeneration of the charge and its rinsing with acid solutions. In addition, such electrolyzers exhibit a small electrode working area with a large volume of the electrolyzer structure. The anode current lead in such electrolyzers is on the casing bottom, at a great distance from the cathode, so as to result in a high ohmic resistance of the electrolytic cell.

Therefore, such electrolyzers are rather inefficient for the purification of fluids.

Known in the art is an electrolyzer described in SU, A, No. 1122618, comprising a cylindrical electrically conducting casing having end plates and mounted for rotation about its axis, the casing being connected to a positive terminal of a power supply and functioning as one of the electrodes of the electrolyzer, a charge of electrically conducting particles in the casing, a second electrode in the form of a cylindrical cathode positioned in the central part of the casing coaxially therewith and insulated from the charge by means of an insulating diaphragm. One end plate of the casing incorporates a pipe for supplying fluid to the electrolyzer for treatment, and the other end plate incorporates a pipe for discharging fluid after the treatment.

During operation of the electrolyzer the casing extends vertically and the charge is stationary so that an intensive contamination of charge occurs. For regeneration of the charge after contamination, fluid treatment is suspended, the casing of the electrolyzer is put into the horizontal position, and the casing is then rotated by a motor about its longitudinal axis of symmetry to reshuffle the chip charge so as to clean it. These measures are, however, rather inefficient and do not allow cleaning of the charge and diaphragm in the central part of the casing to be effected.

For operation of the prior art electrolyzer with continual rotation of the casing, it would be necessary to provide a special design of current leads and pipes for fluid supply and discharge to enable a continual rotation. It should be, however, noted that operation of the electrolyzer with the abovedescribed relative position of the electrodes and casing cannot ensure the desired result. This is due to the fact that charge in the central part of the casing is reshuffled but to a very insignificant extent and does not change its position; at the same time, it is this part of the charge that is most liable to contamination.

SUMMARY OF THE INVENTION

The invention is based on the problem of providing an electrolyzer for the purification of fluids which is so constructed and which has such a relative position of electrodes as to allow the casing to be rotated during purification of fluids to eliminate contamination of the charge and to dispense with regular regeneration of the electrolyzer charge so as to lower energy consumption and enhance throughout capacity of the electrolyzer.

This problem is solved by that in an electrolyzer for the purification of fluids, comprising a cylindrical electrically conducting casing having end plates mounted for rotation about its axis, connected to one terminal of a power supply and functioning as one of the electrodes of the electrolyzer, a charge of electrically conducting particles in the casing, a second electrode connected to the other terminal of the power supply accomodated in the casing and insulated from the charge by means of an insulating diaphragm, pipes for supply fluid to, and discharging it from the casing, according to the invention, the second electrode comprises a partition wall dividing the casing into two chambers extending along the axis of rotation of the casing, the diaphragm consisting of two parts configured similarly to the partition wall, each part being positioned on either side of the partition wall.

To lower voltage of electrolysis of the fluid and to enhance purification of fluid, it is preferred that the partition wall and the parts of the diaphragm extend in parallel planes inclined at 90°–25° with respect to the axis of rotation of the casing.

To increase the amount of dissolved metal and to allow cathodic processes to be carried out during electrolysis of the fluid being treated, the partition wall is preferably made in the form of a charge of electrically conducting particles accomodated in the space between the two parts of the diaphragm.

The advantage of the electrolyzer for the purification of fluids according to the invention resides in the fact that the process of dissolution of the charge occurs at a low electrolysis voltage with the possibility of controlling acid-basic and redox properties of the fluid being treated. Continual rotation of the casing provides conditions for an efficient cleaning of the diaphragm surface, and electrically conducting charge from charge dissolution products and allows the charge surface to be maintained in the active state and high ion yield to be ensured, hence an active formation of metal hydroxides is achieved. All this contributes to lowering electric energy consumption for the purification of fluids.

When the embodiment of the electrolyzer is used with the second electrode in the form of a charge of electrically conducting particles, the charge may consist of metal chip, e.g. soluble in an alkaline medium, in particular, of aluminium chip. In this case, if the first electrode is made of iron chip, a mixed iron-aluminium coagulant may be obtained.

One of advantages of the electrolyzer is the possibility of preparing metal ions and hydroxides with a concurrent change in the value of reactivity (pH) and redox potential (Eh) of an aqueous medium. In this case, the cathode or anode or both the anode and cathode may be made in the form of a charge of electrically conducting particles of a non-soluble material such as coke or graphite.

These embodiments of the electrolyzer make it possible to intensify the process of purification of fluids from various impurities by producing metal ions of various degrees of oxidation during dissolution of metal chip, e.g. ferrous hydroxide, ferric hydroxide and also owing to the occurrence of redox processes on the surface of the charge of non-soluble material and within the bulk of the fluid being treated during release of electrolysis gases.

BRIEF DESCRIPTION OF THE DRAWINGS

The invention will now be described in detail with reference to specific embodiments thereof illustrated in the accompanying drawings, in which.

BEST MODE FOR CARRYING OUT THE INVENTION

Figure 1:
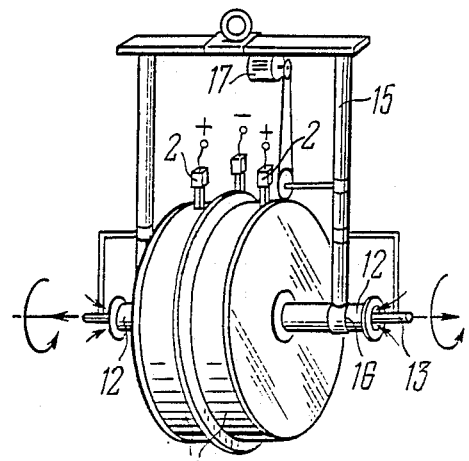
FIG. 1 shows a general perspective view of an electrolyzer for the purification of fluids according to the invention, on a suspension frame.
Figure 2:
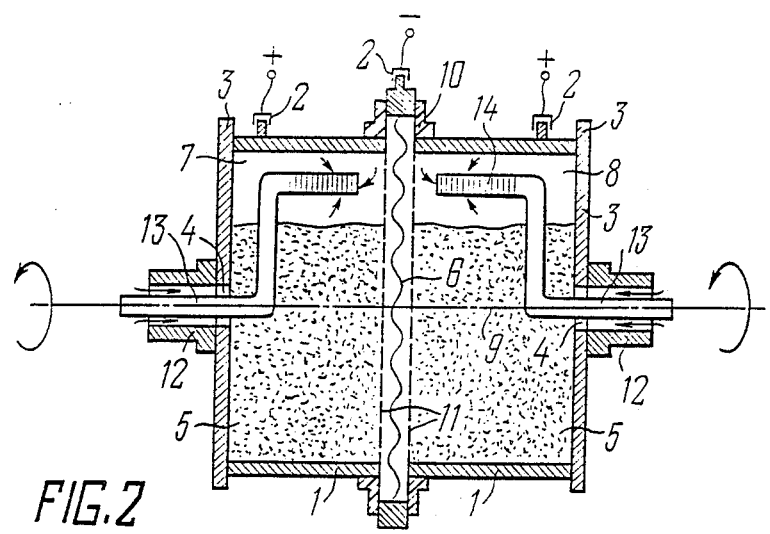
FIG. 2 is ditto, a longitudinal section enlarged view, without a suspension frame.

An electrolyzer shown in FIGS. 1, 2 comprises a cylindrical casing 1 made of a chemically insoluble electrically conducting material e.g. of stainless steel; it is electrically connected to one terminal (positive terminal in this embodiment) of a power supply (not shown in the drawings) by means of brushes 2 and functions as one of the electrodes - anode of the electrolyzer. The casing 1 is provided with end plates 3 having central holes 4. A charge 5 of electrically conducting particles, e.g. metal chip is placed in the casing 1. The casing 1 also accomodates a second electrode of the electrolyzer in the form of a partition wall comprising a round plate 6 of a chemically insoluble metal, e.g. of stainless steel which divides the casing 1 into two chambers 7 and 8 extending along an axis 9 of rotation of the casing 1. The plate 6 is secured to an insulating ring 10 and is electrically connected to a negative terminal of the power supply by means of the brush 2. The plate 6 is electrically insulated from the charge 5 by means of a porous insulating diaphragm 11 consisting of two parts configured simularly to the partition wall - plate 6 and positioned on either side of the plate 6. The electrolyzer has also pipes 12 for supplying fluid or water in this example to the casing 1 for purification, which are mounted in the end plates 3 and communicate with the interior space of the casing 1 through the central holes 4. Pipes 13 for discharging purified water are installed within the pipes 12 concentrically thereto, the ends of the pipes 13 received in the casing 1 being bent in such a manner that their inlet ends 14 are under the charge 5 in the peripheral part of the chambers 7, 8. To facilitate the intake of purified water from the electrolyzer, auxiliary perforation is provided at the inlet ends 14 of the pipes 13.

In FIG. 1 the electrolyzer is shown mounted on a suspension frame 15 and is journalled in sliding-contact bearings 16 provided on the pipes 12, the pipes 13 being rigidly connected to the suspension frame 15 and remaining stationary during rotation of the casing 1 about the axis 9 of rotation. The casing 1 is rotated by means of an electric motor 17 secured to the suspension frame.

Figure 3:
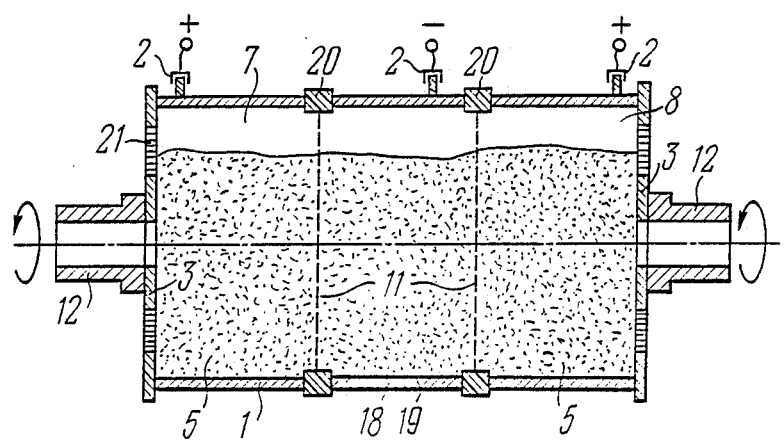
FIG. 3 is an embodiment of an electrolyzer, in a longitudinal section view, in which a second electrode is made in the form of a charge of electrically conducting particles, according to the invention.
Figure 4:
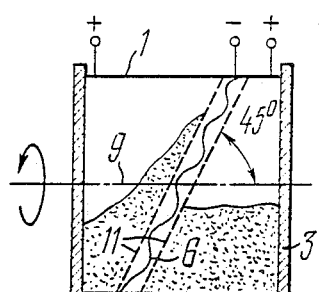
FIG. 4 schematically shows an electrolyzer in which a second electrode and a diaphragm extend in planes inclined at 45° with respect to the axis of rotation of the casing, according to the invention.
Figure 5:
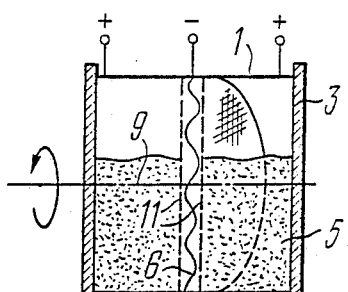
FIG. 5 is ditto of FIG. 4, but the casing is shown in a position turned at 90° about the axis of rotation.
Figure 6:
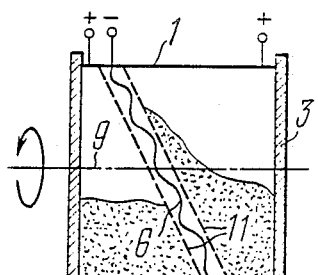
FIG. 6 is ditto of FIG. 4, but the casing is shown in a position turned at 180° about the axis of rotation.
Figure 7:
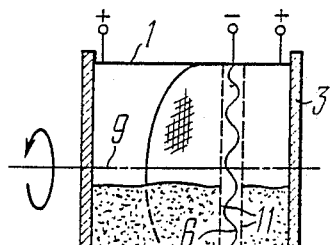
FIG. 7 is ditto of FIG. 4, but the casing is shown in a position turned at 270° about the axis of rotation.

An electrolyzer shown in FIG. 3 is mainly similar to that shown in FIGS. 1, 2 with the only difference that the second electrode is made in the form of a charge 18 of electrically conducting particles placed between the parts of the diaphragm 11. Current supply to the charge 18 is effected by means of a slip ring 19 provided between insulating rings 20 incorporated in the parts of the diaphragm 11.

In addition, in this embodiment of the electrolyzer, the function of the pipes for discharging purified water from the casing 1 is performed by perforation 21 in the end plates 3.

The number of series-arranged electrode chambers in the electrolyzer according to the invention may be larger than shown in FIG. 3 and it depends on application.

An embodiment of the electrolyzer schematically shown in FIGS. 4, 5, 6, 7 differs from the embodiments described with reference to FIGS. 1, 2, 3 in that the second electrode - plate 6 and the parts of the diaphragm 11 extend in parallel planes inclined at an angle of 90° to 25° with respect to the axis of rotation of the casing 1. In this embodiment these planes are inclined at 45° with respect to the axis of rotation 9.

The electrolyzer functions in the following manner. Water to be purified is admitted through the pipe 12 (FIGS. 1, 2) to the interior of the casing 1 of the electrolyzer. The casing 1 is caused to rotate by the electric motor 17 about the axis rotation 9. Electrolysis of water occurs under the action of current supplied to the electrodes of the electrolyzer (casing 1 and plate 6) with dissolution of the electrically conducting charge 5 (in this application the charge 5 is in the form of metal particles). Dissolution of the charge 5 is accompanied by formation of the ferrous ions forming hydroxide comounds in water. Impurities present in the water being treated coagulate and are sorbed with the forming ferrous hydroxide. The water treated in the electrolyzer is discharged through the pipe 13 and fed to further purification to a separator (e.g. filter).

If it is desired to prepare a coagulant in the form of a mixture of certain hydroxides, e.g. ferrous hydroxide and aluminium hydroxide, chip charges 5, 18 (FIG. 3) are placed in the electrolyzer which are made of these metals in a certain percent ratio.

During operation of the electrolyzer containing a finely divided charge which is closely packed, difficulties arise with the removal of the generated coagulant and electrolysis gases from the central part of the apparatus (which remains stationary during rotation of the electrolyzer charged to a level above the axis of rotation 9). In this case the construction of the electrolyzer with the plate electrode 6 and diaphragm 11 inclined at 25°-90° with respect to the axis of rotation 9 of the casing 1 is especially suitable. This position of the second electrode and the diaphragm 11 makes it possible to divide the electrode space of the casing 1 containing the charge 5 into electrolysis chambers having a varying cross-section in the planes drawn in parallel with the axis of rotation 9 of the casing 1 so that the charge 5 can move to a position below the axis of rotation 9 during rotation of the casing 1 thereby eliminating formation of dead zones, the electrode area of interaction of the anode and cathode electrodes remaining unchanged. In using the embodiment of the electrolyzer shown in FIG. 3 where the cathode consists of particles of electrically conducting material (charge 18), bearing in mind that in view of cathodic electrochemical reactions in the cathode chamber water is alkalized, the charge 18 may be used which is soluble in an alkali medium, e.g. aluminium particles.

In applications where it is desired to eliminate dissolution of the metal bulk cathode, the cathode is made in the form of a charge of insoluble electrically conducting particles (e.g. graphite, stainless steel). In this case the charge 18 allows cathode deposition of metal ions available in the water being treated to be carried out concurrently with the preparation of hydroxide of the anode soluble charge (e.g. copper ion deposition from water liquor in the electroplating processes).

If it is desired to eliminate dissolution of the anode, the anode may be made in the form of a charge of electrically conducting chemically insoluble particles (e.g. graphite, coke, stainless steel) and in this case, when electric current is supplied, electrochemical reactions in the water that passed through the anode chamber will result in a lowering of reactivity (pH) of the aqueous medium and in an increase in pH in the cathode chamber. The resultant solution may be further used for controlling properties of the water being treated, i.e. to carry out its acidizing or alkalizing without adding any reagents. The range of pH control is from 2-3 to 10-11 units.

In carrying out electrolysis with a chemically insoluble charge (e.g. graphite), electrolytic gases are released in the chamber 1. Thus oxygen and chlorine are released in the anode chamber of the electrolyzer and hydrogen in the cathode chamber. This facility allows water to be purified in the electrolyzer where it is desired to carry out purification by conducting redox processes, e.g. with oxidation of organic origin contaminants and dyes.

Preferred embodiment of the invention have been described hereinabove which were given for the purposes of illustration only, and it will be apparent to those skilled in the art that various modifications may be made without going beyond the spirit and scope of the invention as defined in the appended claims.

INDUSTRIAL APPLICABILITY

An electrolyzer for purification of fluids may be used in the chemical, electrochemical, mechanical engineering industries, power production, in the food industry and in other industries, preferably for the purification of fluids from contaminants by coagulation of suspended particles, sorbtion of impurities such as heavy metal ions, reduction of hexavalent chromium, change in reactivity.

(pH) and redox potential ($E_h$).

We claim:

1. An electrolyzer for the purification of fluids, comprising a cylindrical electrically conducting casing (1) having end plates (3), mounted for rotation about its axis of symmetry, connected to one terminal of a power supply and functioning as one of the electrodes of the electrolyzer, a charge (5) of electrically conducting particles in the casing (1), a second electrode connected to the other terminal of the power supply accomodated in the casing (1) and insulated from the charge (5) by means of an insulating diaphragm (11), pipes (12, 13) for supply fluid to and discharging it from the casing (1), characterized in that the second electrode comprises a partition dividing the casing (1) into two chambers (7, 8) extending along the axis (9) of rotation of the casing (1), the diaphragm (11) consisting of two parts configured similarly to the partition wall, each part being positioned on either side of the partition wall.

2. An electrolyzer for the purification of fluids as claimed in claim 1, characterized in that the partition wall and the parts of the diaphragm (11) extend in parallel planes inclined at an angle of 90° to 25° with respect to the axis (9) of rotation of the casing.

3. An electrolyzer as claimed in claim 1 or 2, characterized in that the partition wall consists of electrically conducting particles and is in the form of a charge (18) placed between the two parts of the diaphragm (11).

* * * * *